United States Patent
Walker

(10) Patent No.: US 6,378,187 B1
(45) Date of Patent: Apr. 30, 2002

(54) MAGNETIC SPRING ALIGNMENT AND HANDLING SYSTEM

(75) Inventor: Warren T. Walker, Keizer, OR (US)

(73) Assignee: Commercial Vehicle Systems, Inc., Canby, OR (US)

( * ) Notice: Subject to any disclaimer, the term of this patent is extended or adjusted under 35 U.S.C. 154(b) by 0 days.

(21) Appl. No.: 09/540,005

(22) Filed: Mar. 30, 2000

(51) Int. Cl.$^7$ ............................................... B25B 27/14
(52) U.S. Cl. ........................ 29/281.5; 29/225; 29/281.1; 29/282; 269/8
(58) Field of Search ........................ 29/281.5, 225, 29/281.1, 282; 269/6, 8

(56) References Cited

U.S. PATENT DOCUMENTS

| | | |
|---|---|---|
| 2,526,253 A | 10/1950 | Merrill |
| 2,862,601 A | 12/1958 | Littwin et al. |
| 3,104,008 A | 9/1963 | Coffey et al. |
| 3,575,304 A * | 4/1971 | Hurst ............................. 269/8 |
| 3,882,791 A | 5/1975 | Youngscap |
| 3,884,344 A | 5/1975 | Hurst |
| 4,337,856 A | 7/1982 | Dorner |
| D411,478 S | 6/1999 | Kenagy |
| 5,957,822 A * | 9/1999 | Bienhaus et al. ............ 493/100 |
| 5,971,379 A * | 10/1999 | Leon, Jr. ........................ 269/8 |
| 6,045,319 A * | 4/2000 | Uchida et al. .................. 269/8 |
| 6,047,457 A * | 4/2000 | Bitto et al. .................... 29/516 |

* cited by examiner

Primary Examiner—Joseph J. Hail, III
Assistant Examiner—Lee Wilson
(74) Attorney, Agent, or Firm—Dellett and Walters

(57) ABSTRACT

A ferromagnetic spring transfer apparatus employs a movable magnet residing outside of an enclosed pathway, magnetically aligns and holds the ferromagnetic spring while pneumatic cylinders move the spring within the enclosed pathway to a position where another pneumatic cylinder ejects the spring from the enclosed pathway into an assembly location.

19 Claims, 3 Drawing Sheets

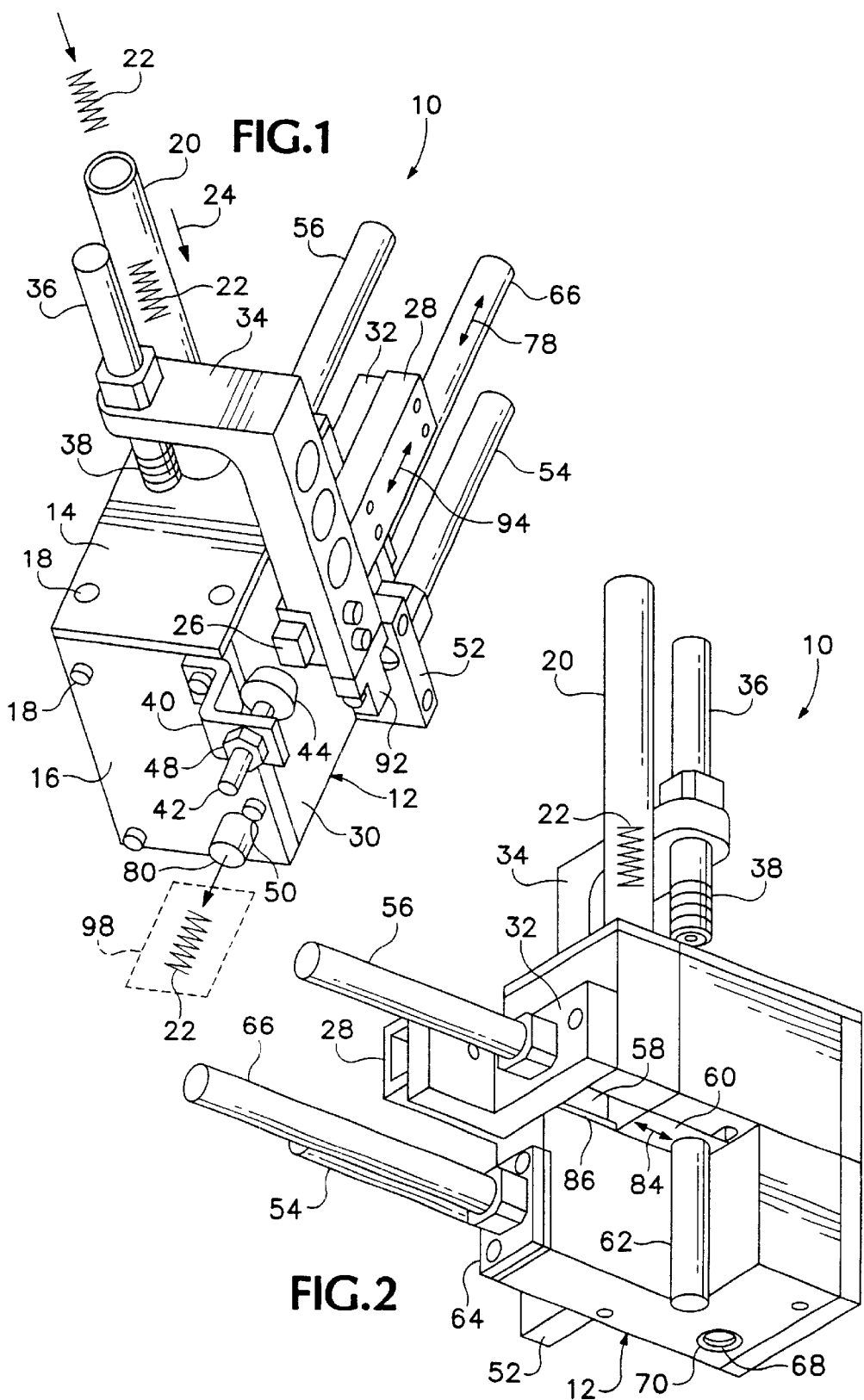

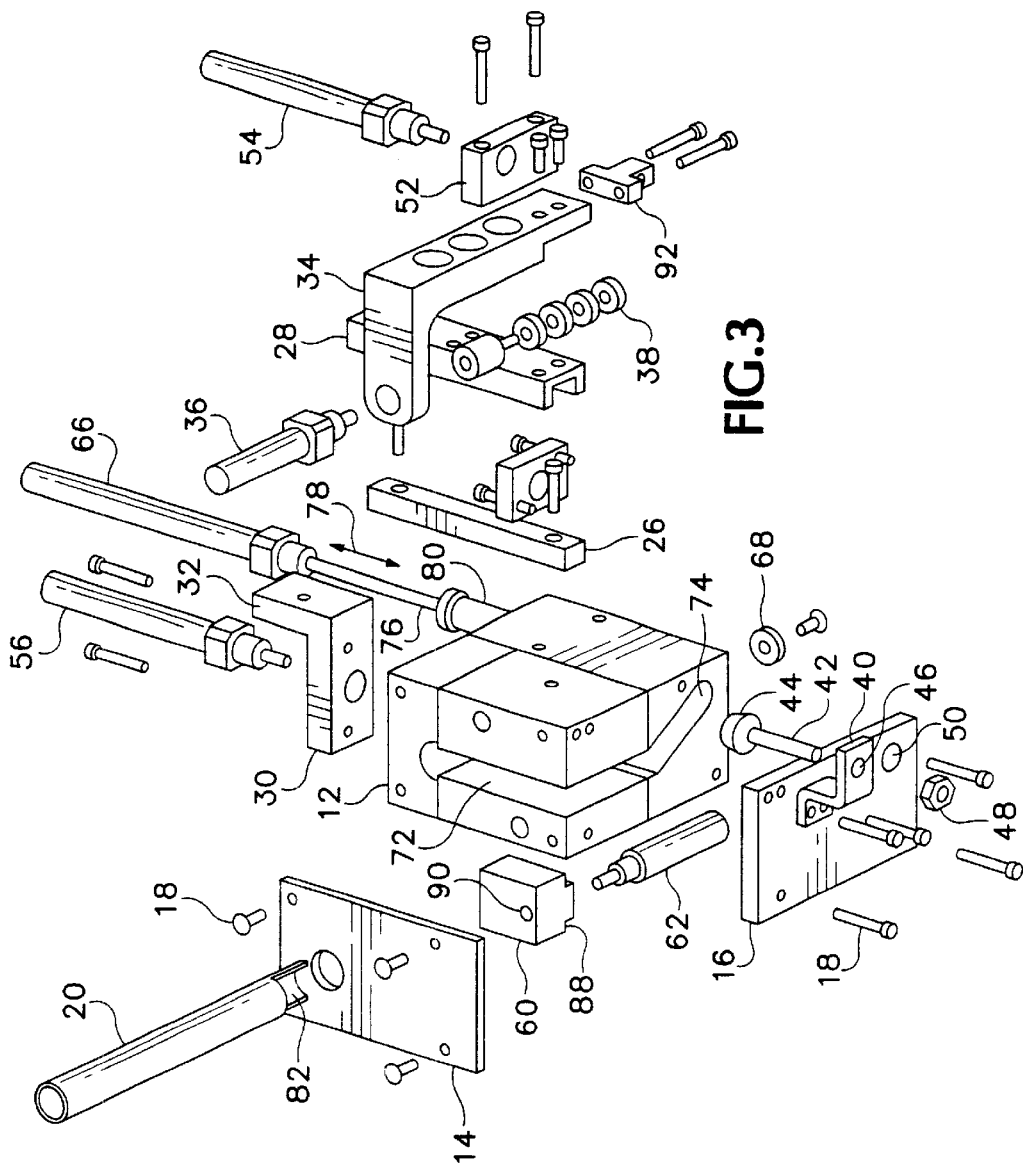

MAGNETIC SPRING ALIGNMENT AND HANDLING SYSTEM

BACKGROUND OF THE INVENTION

This invention relates to the movement of ferromagnetic components, and more specifically to an apparatus and method for handling and aligning a plurality of coiled springs in an automated assembly process.

Metallic coil springs are common components in countless devices. With many of these devices being mass produced, an automated device for the installation of these springs would reduce the installation time, minimize human error and reduce the assembly costs. However, two major problems have stood in the way of the automation of this task.

First, since springs are usually key components in the movement and operation of a mechanical device, precise alignment within the device is critical. Second, because of the wound nature of springs, adjacent springs brought into close proximity often tangle and require manual separation. For these two reasons, currently many assembly jobs that require spring insertions are performed by hand using manual labor.

Current automated component transfer systems use several different mechanisms in combination to grab, pick up, retain, transfer, align and release a spring in order to get the spring from its origin to its final resting place. The added complexity of using numerous mechanisms increases the likelihood of breakdown and narrows the adaptability of the systems for differing components, differing travel paths and different component orientations.

SUMMARY OF THE INVENTION

In accordance with the present invention, an improved ferromagnetic component transfer system is provided for moving and precisely positioning coil springs in a tangle free manner.

Accordingly, it is an object of the present invention to provide an improved component transfer system for plural ferromagnetic components requiring transfer from an initial position to a precisely aligned final position.

It is a further object of the present invention to provide an improved system for transferring and aligning plural ferromagnetic components that are prone to tangling with other similarly situated components during the transfer process.

It is yet another object of the present invention to provide an improved transfer system for quickly, and reliably transferring and aligning ferromagnetic components in an assembly process without human touch.

It is still a further object of the present invention to provide a transfer device that does not require the mechanical coupling and uncoupling of the component from the component transfer device, and which, with minor modifications, can serve in various component assembly machines and processes.

It is yet another object of the invention to provide an improved device for transferring springs in an automated manner during an assembly process, from a supply side to an assembly side.

Another object of the invention is to re-orient and supply springs, one at a time, in an assembly environment.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a top, front perspective view of the preferred embodiment of the ferromagnetic component transfer device;

FIG. 2 is a bottom, rear perspective view of the preferred embodiment of the ferromagnetic component transfer device;

FIG. 3 is an exploded view of the preferred embodiment of the ferromagnetic component transfer device according to the present invention.

DETAILED DESCRIPTION

Figure 4:
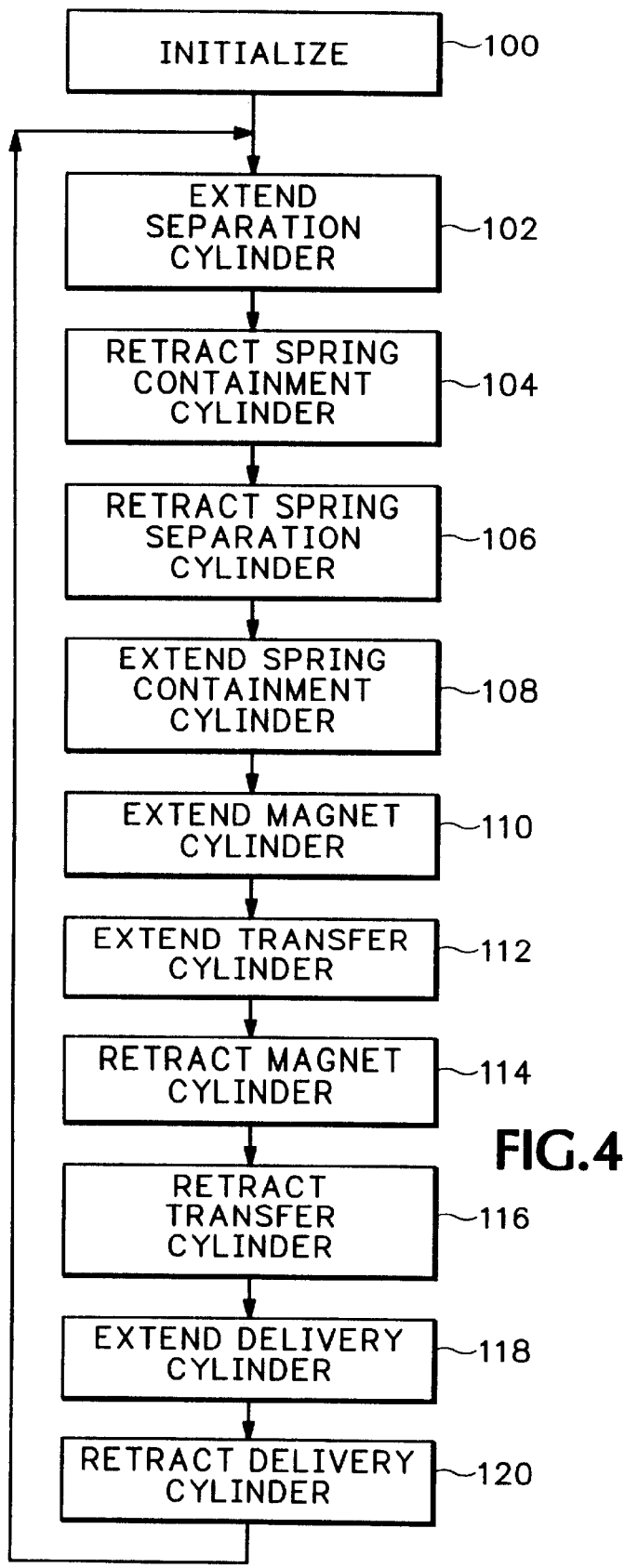
FIG. 4 is a flow chart of the steps performed in the operation of the transfer device.

The system according to the invention moves ferromagnetic articles in an assembly or packaging system from one station to another. In a preferred embodiment, the system comprises an enclosed transfer path and a movable magnetic field generating device located outside of the enclosed transfer path that uses magnetic attraction to transfer and align ferromagnetic springs within the transfer path thereby maneuvering the springs into a position for installation in a device.

Referring now to FIG. 1, a top front perspective view of the preferred embodiment of the ferromagnetic component transfer device 10, a transfer block 12 is provided, suitably comprising a section of non-magnetic material, defining the central body structure of the device. A non-metallic separation plate 14 is mounted to a first face of the body, and a side plate 16 is mounted to a second face of the body, suitably secured by bolts 18. A spring supply tube 20 is received by plate 14, defining a spring supply path into the interior of the transfer block 12, as discussed hereinbelow. The spring supply tube 20 is clear, hollow and cylindrical and rests normally on the separation plate. Plural springs 22 are received into the tube 20, in end to end fashion, suitably moving in the direction of arrow 24 during operation.

A linear bearing guide 26 is bolted to front face 30 on transfer block 12, an arm 32 being provided for additional support and alignment.

A linear bearing channel 28 is slidingly attached to the linear bearing guide so as to form a linear bearing. An l-shaped transfer magnet bracket 34 is attached to the linear bearing channel 28 and oriented such that the bracket's longitudinal axis is perpendicular to the channel's longitudinal axis. A pneumatic cylinder 36 is carried by the bracket at an end distal from the point of mounting to the bearing channel, and a transfer magnet array 38 is carried at one end of the cylinder, suitably the end closest to the transfer block 12. A bumper bracket 40 is affixed to the plate 16, extending outwardly beyond the body of the transfer block, supporting an adjustable bumper arm 42. A bumper member 44 is suitably attached to one end of the bumper arm. Bumper arm 42 is threadingly engaged with a hole 46 (FIG. 3) in the bracket and is secured in place with jam nut 48. A spring exit or delivery port 50 extends through the side plate 16 at a lower corner thereof.

Bolted perpendicularly onto the face of the transfer block carrying the linear bearings, and located below the bearings is a support plate 52. The support plate carries a double acting pneumatic transfer cylinder 54, which is cooperatively engaged with bracket 34.

Referring now to FIG. 2, a bottom rear perspective view of the preferred embodiment of the ferromagnetic component transfer device, arm 32 bolts to the back side face of the transfer block and carries spring separation cylinder 56 thereon. The spring separation cylinder is suitably a double acting pneumatic cylinder that projects into a slide recess 58 inside the body of transfer block 12. A slide block 60, which carries spring containment cylinder 62, is operatively attached to the spring separation cylinder 56.

A transfer cylinder mounting plate 64 is bolted to the transfer block 12, somewhat below the location of 32, and supports a pneumatic delivery cylinder 66 thereon. Cylinder 66 is suitably aligned with the delivery port 50 (not visible in FIG. 2). Also positioned in the transfer block 12, beneath the position of the delivery port, set back slightly from the edge of the body, is a delivery magnet 68, mounted in an exterior recess 70 in the transfer body.

In operation of the device, the springs 22 are received via supply tube 20 in the direction of arrow 24, and exit the transfer block 12 at delivery port 50.

To understand how this is accomplished, reference will now be made to FIG. 3, which is an exploded view of the ferromagnetic component transfer device, together with FIG. 1 and FIG. 2. It will be noted that the transfer block 12 has a transfer groove 72 defined therein extending downwardly approximately half the height of the block 12, and which is further in communication with a delivery groove 74 which is cut at an angle and terminates in a position corresponding to the position of delivery port 50. At the opposite side of the block 12, delivery cylinder 66 drives arm 76 inwardly and outwardly in the direction of arrow 78. A spring engaging piston 80 is carried on the outermost end of the arm and projects through a hole in the mounting plate and the transfer block so as to move in the delivery groove 74. It will be noted that each of the respective cylinders carry arm portions thereon, whereby actuation of the cylinders causes the arms to extend or retract. The arm of cylinder 56 is engaged with slide 60, wherein operation of cylinder 56 causes slide 60 to move in the direction of arrow 84 along slide rails 86 defined within the transfer block. The slide rails cooperate with corresponding shoulder portions 88 on the slide 60. Since cylinder 62 is secured to the slide 60, it will move with movement of the slide. The arm of cylinder 62 is extensible up through an opening 90 in the slide.

In operation, springs 22 are fed into supply tube 14 and exit via delivery port 50. The initial configuration of the various cylinders are as follows: The arm of spring containment cylinder 62 is extended, spring separation cylinder 56 has its arm retracted, the arm of magnet cylinder 54 is retracted, as are the arms of the transfer cylinder 66 and the delivery cylinder 36.

Supply tube 20 is filled with substantially similar ferrometallic coil springs 22 positioned end to end to form a column such that the longitudinal axes of the springs are aligned with the longitudinal axis of the supply tube. A constant delivery stream of springs is fed through the center of the supply tube into the transfer groove. Since the supply tube is preferably made of a lightweight clear material such as LEXAN, visual inspection is allowed. Gravity acts upon the spring column such that the lead spring travels to the supply outlet end 82 of the tube and the center of the spring drops over the extended spring containment cylinder 62 arm until the spring's leading edge contacts the transfer block, stopping in transfer groove 72.

With the lead spring contained by spring containment cylinder 62, the spring separation cylinder 56 is extended pushing slide block 60 away from cylinder 56 (perpendicular to the longitudinal axis of the spring as it rests on the containment cylinder arm). The spring containment cylinder traverses along the transfer groove, maintaining the orientation of the lead spring within the groove 72. This sideways movement removes the spring from alignment with the spring column and transfers it partially along groove 72. After the spring separation cylinder 56 has reached the extent of its movement, the spring containment cylinder 62 retracts, freeing the separated lead spring which remains within transfer groove 72. Spring separation cylinder 56 now retracts, moving slide block 60 back to its original position. The spring containment cylinder 62 again extends and projects into the center of the next spring that is waiting at the end of the supply tube, preventing any premature movement of the next spring within transfer groove 72.

At this point magnet cylinder 36 is extended to push transfer magnet array 38 into close proximity to with separation plate 14. The magnetic field of the transfer magnet array penetrates separation plate 14 reaching the spring. Due to the coiled configuration of the ferromagnetic spring, upon introduction of the magnetic field from transfer magnet array 38, a hall effect is induced in the spring developing a magnetic field perpendicular to the longitudinal axis of the spring causing the spring to change its physical orientation in response to the attractive forces of the transfer magnet array. The spring turns, such that the longitudinal axis of the spring shifts 90 degrees within transfer groove 72 and the spring is pulled into contact with the inside face of separation plate 14.

With the magnet cylinder 36 still extended, the transfer cylinder 56 is now extended, forcing mounting block 92 and transfer magnet bracket 34 to slide with linear bearing channel 28 along linear bearing guide 26 in a horizontal direction (arrow 94 of FIG. 1) across the transfer block. This causes the reoriented spring to be magnetically pulled along the rear face of separation plate 14 in transfer groove 72 until magnet bracket 34 contacts bumper 44 and stops. The magnet cylinder retracts and moves transfer magnet array 38 away from close contact with the separation plate. This removes the magnetic field of transfer magnet array 38 from the spring, and the spring, in absence of the magnetic field, rolls by gravity into delivery groove 74 where it abuts the delivery groove bottom wall and is securely retained in this position by orientation magnet 68.

The transfer cylinder is now retracted so as to pull mounting block 96 and magnet bracket 34 along the linear bearing guide, returning the transfer magnet bracket to the initial position.

Now, delivery cylinder 66, which protrudes through an orifice in the transfer block into orientation groove 74, is extended and piston 80 contacts the spring. The longitudinal axis of delivery cylinder arm 66 is aligned with the longitudinal axis of the spring and pushes the spring out of the transfer block through delivery port 50 in side plate 16 and into the spring's final resting position in an awaiting assembly 98 (illustrated in phantom). If desired by the particular application, the delivery cylinder 66 can continue to extend, to compress the spring. Now, with the spring in position (or further operations thereto being taken over by another process) delivery cylinder arm 66 retracts out of orientation groove 74 signaling the end of the transfer, orientation and delivery cycles. The process can now begin again with the next spring that is waiting on the spring containment cylinder 62.

FIG. 4, a flow chart of the operational steps of the device, illustrates the cycle of operation. Initialization step 100 is performed when the device is first started, and as noted above, entails having the spring containment cylinder extended and the other cylinders retracted (spring separation, magnet cylinder, transfer cylinder and delivery cylinder). The supply tube is filled with ferromagnetic coil springs, and the lead spring in the tube is centered on the spring containment cylinder. Once the device is initialized, in operation, the spring separation cylinder is extended (step 102), the spring containment cylinder is retracted (step 104), the spring separation cylinder is retracted (step 106), the spring containment cylinder is extended (step 108) the magnet cylinder is extended (step 110), the transfer cylinder is extended (step 112), the magnet cylinder is retracted (step 114), the transfer cylinder is retracted (step 116), the delivery cylinder is extended (step 118) and the delivery cylinder is retracted (step 120). At this point, the spring has been moved from the supply tube through the device and to the delivery point. Operation continues by looping back to step 102 to start the cycle over again.

It should be noted that distance that the magnet cylinder arm positions the magnet array from the separation plate is adjustable, by loosening the jam nut on the cylinder and threading the cylinder inwardly or outwardly from its mounting bracket. The distance is determined by the magnetic field strength required inside of the guide block to attract the spring and subsequently later release the spring when the magnet array is moved away from the separation plate. In the preferred embodiment, a stacked array of toroidal permanent rare earth magnets comprise the magnet array 38, magnetically maintained on a shaft of the magnet cylinder. The number of magnets in the transfer magnet array can be varied with the strength requirement of the particular configuration. There must be sufficient magnetic strength to penetrate through the separation plate and attract the lead spring. A magnetic backing plate may also be utilized to increase the directional magnetic field strength of the transfer magnet array and the orientation magnet, if desired.

The separation plate is suitably clear to allow visual inspection of the device and can quickly be removed in the event of a jam. The plate is also fabricated from non-magnetic material as the constant proximity to transfer magnet array 38 would eventually lead to the permanent magnetism of the separation plate.

The extent of movement of the linear slide is adjusted by movement of the bumper 44, for fine tuning of operation of the device. With the bumper moved inwardly or outwardly, the end of travel of the linear slide can be fine tuned.

Although in accordance with the preferred embodiment, transfer, orientation and delivery of ferrometallic springs is accomplished, other assembly parts may be employed. The magnets used need not be of the permanent magnet type, for example. In an embodiment where an electromagnet is used, the magnetic field strength may be varied throughout the process. For example, a moderate strength magnetic field may be used initially orient the component with a higher strength field used when the component is being transported, and finally the weakest force used to release the component.

Similarly, although pneumatic cylinders are used in the preferred embodiment, hydraulic or electric cylinders as well as combinations with spring assisted cylinders may be used in alternate embodiments.

The transfer and deliver groove sizes and configurations are determined according to the size of the component and the particular final orientation that is desired.

In the preferred embodiment the supply tube and separation plate are made of LEXAN, the slide block and magnet carrying shaft are made of steel, while the transfer block, slide rails and most of the other parts are fabricated from aluminum.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A ferromagnetic component alignment device comprising:
   at least one movable magnet;
   a non-ferromagnetic transfer block with a path formed therein to accommodate at least one ferromagnetic component; and
   a separation plate,
   wherein said separation plate is positioned between a portion of said path and said movable magnet.

2. The ferromagnetic component alignment device of claim 1 wherein said ferromagnetic component comprises a coil spring.

3. The ferromagnetic component alignment device of claim 1 further comprising at least one component moving device.

4. The ferromagnetic component alignment device of claim 3 wherein said component moving device is selected from the group consisting of pneumatic cylinders, hydraulic cylinders and electrically operated cylinders.

5. The ferromagnetic component alignment device of claim 3 wherein said component moving device further includes a component separation device.

6. The ferromagnetic component alignment device of claim 3 wherein said component moving device further comprises a delivery cylinder adapted to push said component along said path to a delivery point.

7. The ferromagnetic component alignment device of claim 1 further comprising a ferromagnetic component supply tube with one end having a cut away region that projects through said separation plate into said path.

8. The ferromagnetic component alignment device of claim 5 wherein said supply tube comprises a transparent, non-magnetic material.

9. The ferromagnetic component alignment device of claim 1 wherein said separation plate comprises a transparent, non-magnetic material.

10. The ferromagnetic component alignment device of claim 1, further comprising a component retention member mounted normally on a movable slide block within said transfer block.

11. The ferromagnetic component alignment device of claim 10, wherein said component retention member includes a retractable arm axially alignable with said supply tube and adapted to retractably engage the component.

12. A ferromagnetic spring alignment device comprising:
    a non-magnetic transfer block with a path formed therein, to accommodate at least one ferromagnetic spring;
    a non-magnetic, separation plate; and
    a spring moving system utilizing at least one magnet,
    wherein said magnet, plate and block reside in a stacked configuration.

13. The ferromagnetic spring alignment device of claim 12 wherein said spring moving system comprises at least one pneumatic cylinder with a retractable arm adapted to transfer said spring along said path.

14. The ferromagnetic spring alignment device of claim 12 wherein said spring moving system further comprises;
- a spring retention cylinder mounted on a movable slide block within said transfer block and adapted to retractably project through a slot in said transfer block and into the center of said coil spring in said path;
- a spring separation cylinder attached to said transfer block adapted to retractably move said slide block within a slide recess;
- a magnet cylinder adapted to move said magnet into close proximity with said separation plate;
- a transfer cylinder mounted to said transfer block adapted to move said magnet in a direction substantially parallel to an axis of said path; and
- a delivery cylinder mounted to said transfer block adapted to push said spring along said path through a delivery port and out of said transfer block.

15. The ferromagnetic spring alignment device of claim 12 wherein said separation plate has a thickness to allow permeation therethrough of a magnetic field from said magnet, wherein said field has sufficient strength to urge said ferromagnetic spring along said path as said magnet is moved.

16. The ferromagnetic component alignment device of claim 12 wherein said magnet comprises a permanent magnet.

17. The ferromagnetic component alignment device of claim 12 wherein said magnet comprises an electromagnet.

18. A ferromagnetic article transfer apparatus comprising:

at least one magnetic field generating means; and a transfer path having a first side and a second side, wherein said magnetic field generating means is positioned on said first side of the transfer path and in close proximity to said transfer path so that when said magnetic field generating means is moved in a trajectory corresponding to the transfer path, a ferromagnetic article placed on the second side of the transfer path is transported along the transfer path.

19. The ferromagnetic article transfer apparatus of claim 18 wherein said ferromagnetic article comprises a coiled spring.

* * * * *